United States Patent
Minoura

(10) Patent No.: US 11,647,093 B2
(45) Date of Patent: May 9, 2023

(54) SERVER DEVICE CONFIGURED TO TRANSMIT A MESSAGE RECEIVED FROM A PUBLISHER DEVICE TO ONE OR MORE SUBSCRIBER DEVICES BASED ON THE MESSAGE TYPE AND CONDITION ASSOCIATED THEREWITH

(71) Applicant: TOSHIBA TEC KABUSHIKI KAISHA, Tokyo (JP)

(72) Inventor: Yusuke Minoura, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/338,608

(22) Filed: Jun. 3, 2021

(65) Prior Publication Data
US 2022/0078254 A1 Mar. 10, 2022

(30) Foreign Application Priority Data
Sep. 10, 2020 (JP) .............................. JP2020-152167

(51) Int. Cl.
*G06F 15/173* (2006.01)
*H04L 67/55* (2022.01)
*H04L 51/212* (2022.01)
*H04L 51/214* (2022.01)

(52) U.S. Cl.
CPC ............ *H04L 67/55* (2022.05); *H04L 51/212* (2022.05); *H04L 51/214* (2022.05)

(58) Field of Classification Search
CPC ...... H04L 67/55; H04L 51/214; H04L 51/212

USPC .......................................................... 709/224
See application file for complete search history.

(56) References Cited

U.S. PATENT DOCUMENTS

| | | | | |
|---|---|---|---|---|
| 7,376,092 B2* | 5/2008 | Yajnik | ..................... | H04L 67/63 709/202 |
| 7,822,801 B2* | 10/2010 | Zhao | ....................... | G06Q 10/10 709/201 |
| 7,827,077 B2* | 11/2010 | Shiftan | ................ | G06Q 20/389 705/28 |
| 8,548,859 B2* | 10/2013 | Matkovic | ............... | G06Q 40/12 705/16 |
| 8,643,875 B2* | 2/2014 | Shapiro | ................ | G06Q 10/107 358/1.9 |
| 10,217,098 B2* | 2/2019 | Argue | .................. | G06Q 20/209 |
| 2002/0032602 A1* | 3/2002 | Lanzillo, Jr. | ........... | G06Q 30/06 705/14.66 |
| 2002/0103743 A1* | 8/2002 | Najmi | ..................... | G06F 9/542 705/37 |
| 2004/0260683 A1* | 12/2004 | Chan | ................... | G06F 16/9027 |

(Continued)

*Primary Examiner* — Alicia Baturay
(74) *Attorney, Agent, or Firm* — Kim & Stewart LLP

(57) ABSTRACT

A server device includes a communication interface configured to communicate with one or more publisher devices and one or more subscriber devices. A memory stores data indicating message types to be issued by the publisher devices. Each message type is stored in association with both a condition for filtering messages of the message type and a subscriber device destination for messages of the message type meeting the condition. A processor is configured to determine whether a message meets a condition associated with the message type, and transmit the message to the subscriber devices indicated by the corresponding destination information when the condition is met.

14 Claims, 6 Drawing Sheets

T1

| MESSAGE TYPE | FILTERING TARGET | FILTERING CONDITION | DESTINATION INFORMATION |
|---|---|---|---|
| RECEIPT | Yes | INCLUDE SPECIFIC CHARACTER STRING X | DESTINATION INFORMATION A |
| RECEIPT | Yes | INCLUDE SPECIFIC CHARACTER STRING Y | DESTINATION INFORMATION B |
| PRINTER STATUS | No | — | DESTINATION INFORMATION C |
| RAS INFORMATION | No | — | DESTINATION INFORMATION D |
| ⋮ | ⋮ | ⋮ | ⋮ |

(56) References Cited

U.S. PATENT DOCUMENTS

| | | | |
|---|---|---|---|
| 2006/0233322 A1* | 10/2006 | Allman | H04L 67/568 |
| | | | 379/88.01 |
| 2007/0198629 A1 | 8/2007 | Ganguly et al. | |
| 2008/0133541 A1* | 6/2008 | Fletcher | G06F 16/367 |
| 2010/0177343 A1* | 7/2010 | Shapiro | G06Q 20/209 |
| | | | 709/203 |
| 2018/0253712 A1* | 9/2018 | Mori | G06Q 20/202 |
| 2020/0193529 A1* | 6/2020 | Gojo | G06Q 20/20 |

\* cited by examiner

| MESSAGE TYPE | FILTERING TARGET | FILTERING CONDITION | DESTINATION INFORMATION |
|---|---|---|---|
| RECEIPT | Yes | INCLUDE SPECIFIC CHARACTER STRING X | DESTINATION INFORMATION A |
| RECEIPT | Yes | INCLUDE SPECIFIC CHARACTER STRING Y | DESTINATION INFORMATION B |
| PRINTER STATUS | No | — | DESTINATION INFORMATION C |
| RAS INFORMATION | No | — | DESTINATION INFORMATION D |
| ... | ... | ... | ... |

SERVER DEVICE CONFIGURED TO TRANSMIT A MESSAGE RECEIVED FROM A PUBLISHER DEVICE TO ONE OR MORE SUBSCRIBER DEVICES BASED ON THE MESSAGE TYPE AND CONDITION ASSOCIATED THEREWITH

CROSS-REFERENCE TO RELATED APPLICATION

This application is based upon and claims the benefit of priority from Japanese Patent Application No. 2020-152167, filed Sep. 10, 2020, the entire contents of which are incorporated herein by reference.

FIELD

Embodiments described herein relate generally to a communication device, such as a computer server, a program executed thereby, and a communication method associated with subscription-based content delivery and/or messaging.

BACKGROUND

In a system called a content-based subscription system a message can be transmitted simultaneously to multiple registered subscribers. In such a system, a message is distributed to all subscribers with registered subscriptions corresponding to the content of the transmitted message, but it is generally difficult to flexibly limit the receivers.

BRIEF DESCRIPTION OF THE DRAWINGS

FIG. 3 shows a data structure of a subscription table according to a first embodiment.

DETAILED DESCRIPTION

Figure 1:
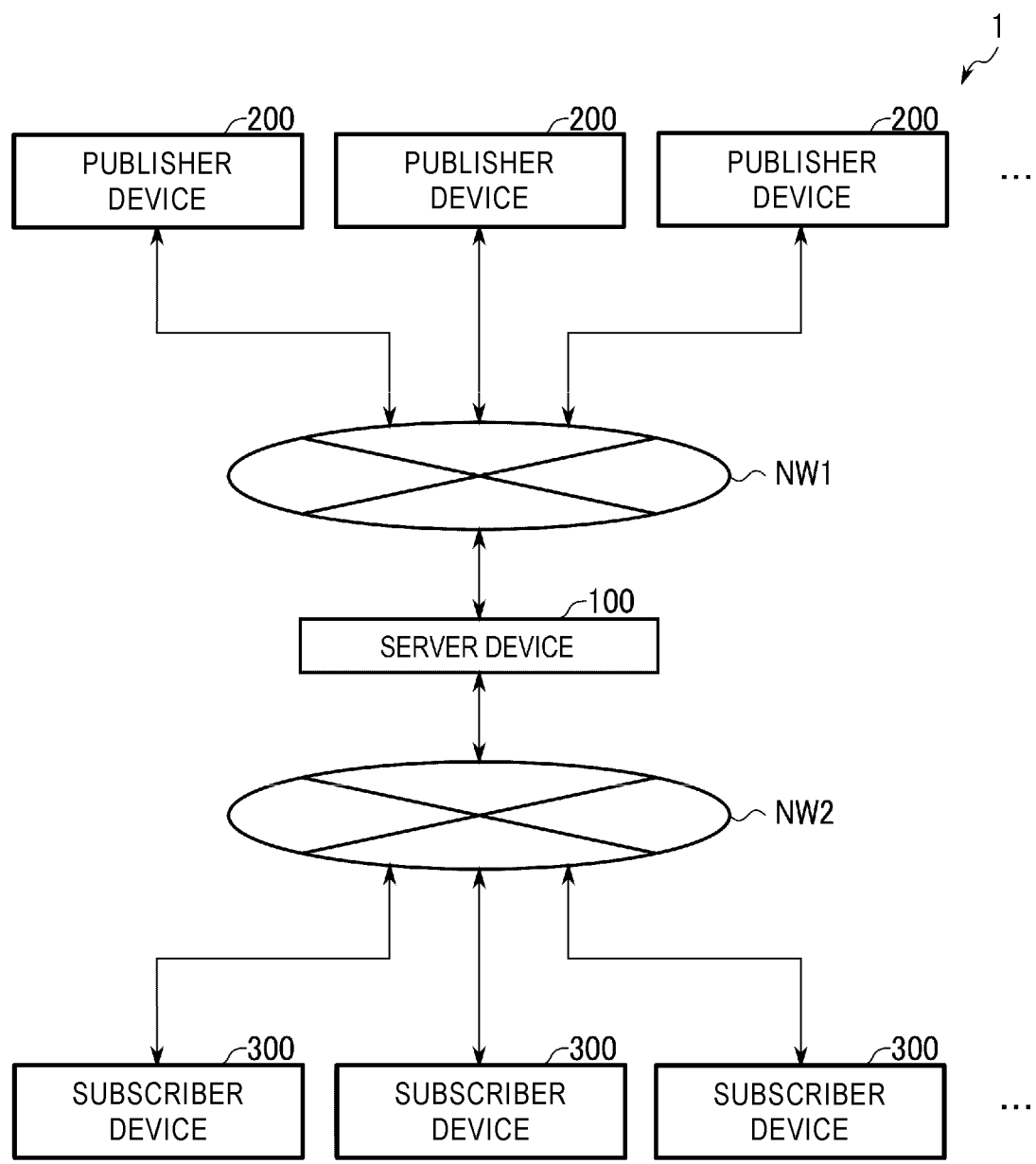
FIG. 1 is a block diagram showing a subscription system according to a first embodiment.

At least one embodiment described herein provides a communication device, a program, or a communication method that enables transmission of a message to just some subset of registered subscribers according to certain conditions.

In general, according to one embodiment, a server device includes a communication interface configured to communicate with one or more publisher devices and one or more subscriber devices, a memory that stores data indicating a message type to be issued the publisher devices in association with both a condition for filtering messages of the message type and destination information indicating the subscriber device(s) to which messages of the message type are to be transmitted, and a processor. The processor is configured to, upon receipt of message information from a publisher device including a message and message type for the message, refer to the data stored in the memory and determine whether a condition associated with the message type is satisfied by the message. If the condition is satisfied by the message, control the communication interface to transmit the message to the subscriber device(s) indicated by the corresponding destination information.

Subscription systems and associated programs and communication methods according to some example embodiments will be described with reference to the drawings. In certain drawings, some components or aspects may be omitted for the sake of explanation. In the drawings and the specification, the same reference signs are used to refer to substantially similar elements.

First Embodiment

FIG. 1 is a block diagram showing certain aspects of a subscription system 1 (also referred to as a subscriber system, a subscription-based content delivery system, a subscriber messaging service, or the like) according to a first embodiment. In the subscription system 1, a message from a publisher device 200 is transmitted to a registered subscriber device 300. In an example, the subscribe system 1 includes a server device 100, a plurality of publishers 200, and a plurality of subscribers 300. The numbers of server devices 100, publisher devices 200, and subscriber devices 300 are not limited to the numbers shown in FIG. 1.

The server device 100 and each publisher device 200 are connected to a network NW1. The network NW1 is a communication network including the Internet, a LAN (local area network), or the like. The network NW1 may be a wireless network or a wired network and may also be a combination of a wireless network and a wired network.

The server device 100 and each subscriber device 300 are connected to a network NW2. The network NW2 is a communication network including the Internet, a LAN, or the like. The network NW2 may be a wireless network or a wired network and may also be a combination of a wireless network and a wired network. The network NW1 and the network NW2 may be the same communication network.

Figure 2:
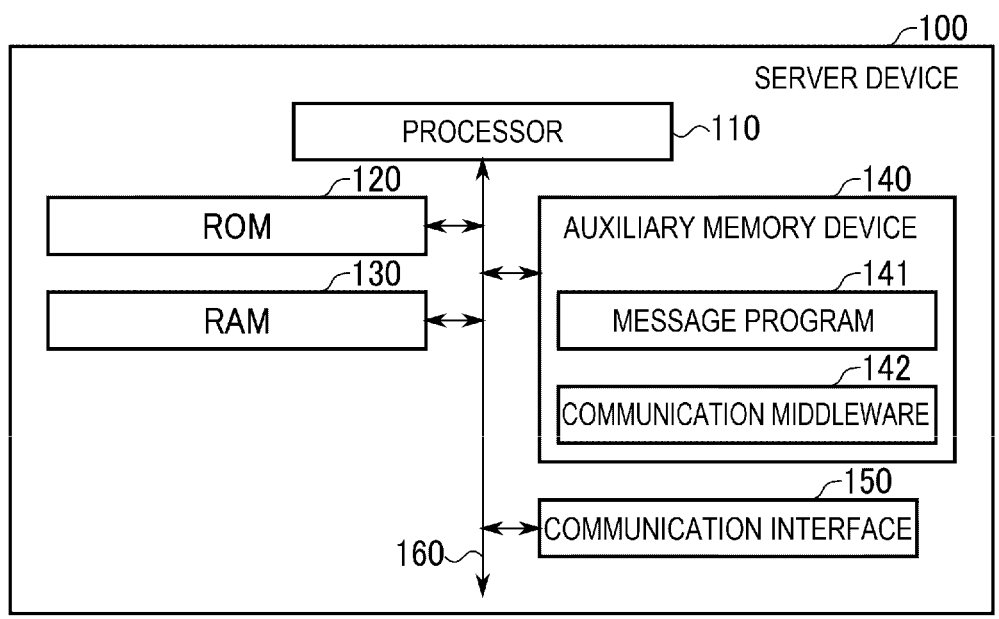
FIG. 2 is a block diagram showing a server device according to a first embodiment.

FIG. 2 is a block diagram showing certain aspects of the server device 100.

The server device 100 transmits a message transmitted from each publisher device 200, to one or more of the subscriber devices 300. In an example, the server device 100 includes a processor 110, a ROM (read-only memory) 120, a RAM (random-access memory) 130, an auxiliary memory device 140, and a communication interface 150. Those components are connected to each other via a bus 160 or the like.

The processor 110 performs processing necessary for the server device 100 to operate. The processor 110 controls each component to perform various functions of the server device 100 by executing programs such as firmware, system software, and application software stored in the ROM 120, the auxiliary memory device 140, or the like. The processor 110 also executes processing, described later, based on these programs. A part or all of the functions achieved by the programs may be implemented by one or more circuits. The processor 110 is, for example, a CPU (central processing unit), an MPU (micro processing unit), an SoC (system on a chip), a DSP (digital signal processor), a GPU (graphics processing unit), an ASIC (application-specific integrated circuit), a PLD (programmable logic device), an FPGA (field-programmable gate array), or the like. Alternatively, the processor 110 may be a combination of a plurality of these units.

The ROM 120 is a non-volatile memory that is not rewritable. The ROM 120 stores, for example, the foregoing programs and data or the like used by the processor 110 to perform various kinds of processing.

The RAM 130 is a main memory used to read and write data. The RAM 130 is used as a work area or the like for temporarily storing data that is used by the processor 110 to perform various kinds of processing. Typically, the RAM 130 is a volatile memory.

The auxiliary memory device 140 is, for example, an EEPROM (electrically erasable programmable read-only memory), an HDD (hard disk drive), a flash memory, or the like. The auxiliary memory device 140 stores, for example, system software, application software, and the foregoing programs. The auxiliary memory device 140 also stores data used by the processor 110 to perform various kinds of processing, and data and various set values or the like generated through the processing by the processor 110.

The programs stored in the auxiliary memory device 140 includes a message program 141 and communication middleware 142. The message program 141 is software for determining a destination of a message, for example. The communication middleware 142 is software for processing related to communication such as transmitting and receiving a message.

The auxiliary memory device 140 stores a subscription database. The subscription database correlates the registered subscriber devices 300 with a message type on a per message type basis. In an example, the subscription database includes a subscription table T1 as shown in FIG. 3.

FIG. 3 shows a data structure of the subscription table T1 stored in the auxiliary memory device 140. The subscription table T1 correlates each message type with information representing whether the message type is a filtering target. In this context, a message type that is a "filtering target" is a message type that might be excluded (filtered), or otherwise prevented, from being received by a particular subscriber according to certain conditions related to preference, system setting, or the like. In FIG. 3, for example, a message type that is a filtering target is indicated by "Yes" and a message type that is not a filtering target is indicated by "No". The subscription table T1 also correlates filtering conditions, if any, with each message type. The subscription table T1 also correlates destination information to each message type. If a message type is potentially subject to different filtering conditions, then destination information can be provided on a per filter condition basis. The destination information specifies a destination of the message.

The communication interface 150 is a network interface circuit for the server device 100 to communicate via the network NW1, the network NW2, and the like. The server device 100 controls the communication interface 150 using the communication middleware.

The bus 160 includes a control bus, an address bus, a data bus, or the like, and conveys a signal sent and received by each part of the server device 100.

Figure 4:
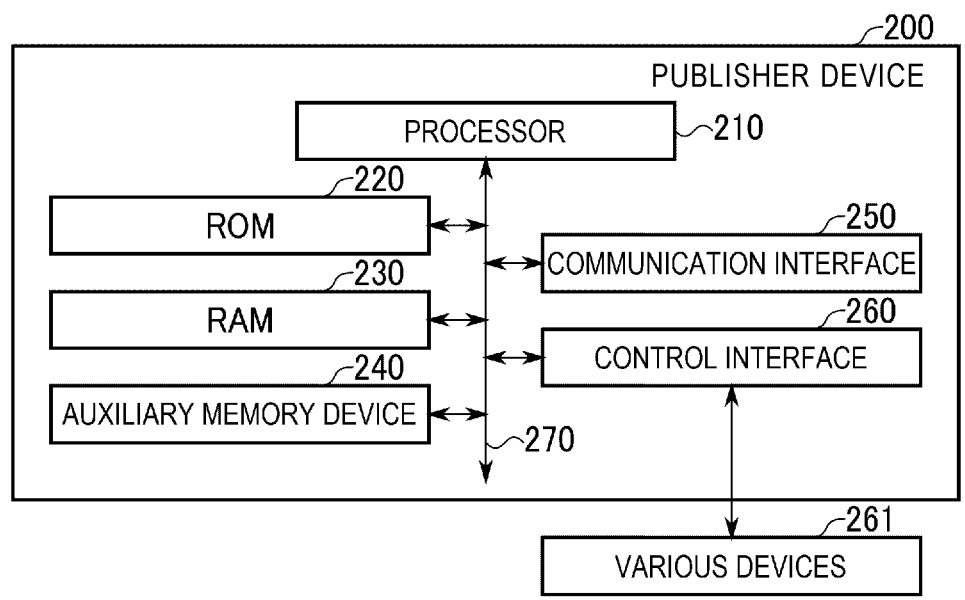
FIG. 4 is a block diagram showing a publisher device according to a first embodiment.

FIG. 4 is a block diagram showing certain aspects of a publisher device 200. The publisher device 200 is a device that transmits a message to one or more of the subscriber devices 300. The publisher device 200 is, for example, a PC (personal computer), a POS (point of sales) terminal, or the like. In an example, the publisher device 200 includes a processor 210, a ROM 220, a RAM 230, an auxiliary memory device 240, a communication interface 250, and a control interface 260. Those components are connected to each other via a bus 270 or the like.

The processor 210 performs processing necessary for the publisher device 200 to operate. The processor 210 controls each component to perform various functions of the publisher device 200 by executing programs such as firmware, system software, and application software stored in the ROM 220, the auxiliary memory device 240, or the like. The processor 210 also executes processing, described later, based on these programs. A part or all of the functions achieved by the programs may be implemented by one or more circuits. The processor 210 is, for example, a CPU, an MPU, an SoC, a DSP, a GPU, an ASIC, a PLD, an FPGA, or the like. Alternatively, the processor 210 may be a combination of a plurality of these units.

The ROM 220 is a non-volatile memory that is not rewritable. The ROM 220 stores, for example, the foregoing programs and data or the like used by the processor 210 to perform various kinds of processing.

The RAM 230 is a main memory used to read and write data. The RAM 230 is used as a work area or the like for temporarily storing data that is used by the processor 210 to perform various kinds of processing. Typically, the RAM 230 is a volatile memory.

The auxiliary memory device 240 is, for example, an EEPROM, an HDD, a flash memory, or the like. The auxiliary memory device 240 stores, for example, system software, application software, and the foregoing programs. The auxiliary memory device 240 also stores data used by the processor 210 to perform various kinds of processing, and data and various set values or the like generated through the processing by the processor 210.

The communication interface 250 is a network interface circuit for the publisher device 200 to communicate via the network NW1 or the like.

The control interface 260 is an interface circuit connectable to various devices 261. The publisher device 200 communicates with the various devices 261 via the control interface 260. The publisher device 200 controls the various devices 261 via the control interface 260. The various devices 261 are peripheral devices including a printer, a camera, a display, an input device, or the like.

The bus 270 includes a control bus, an address bus, a data bus, and or the like, and conveys a signal sent and received by each part of the publisher device 200.

Figure 5:
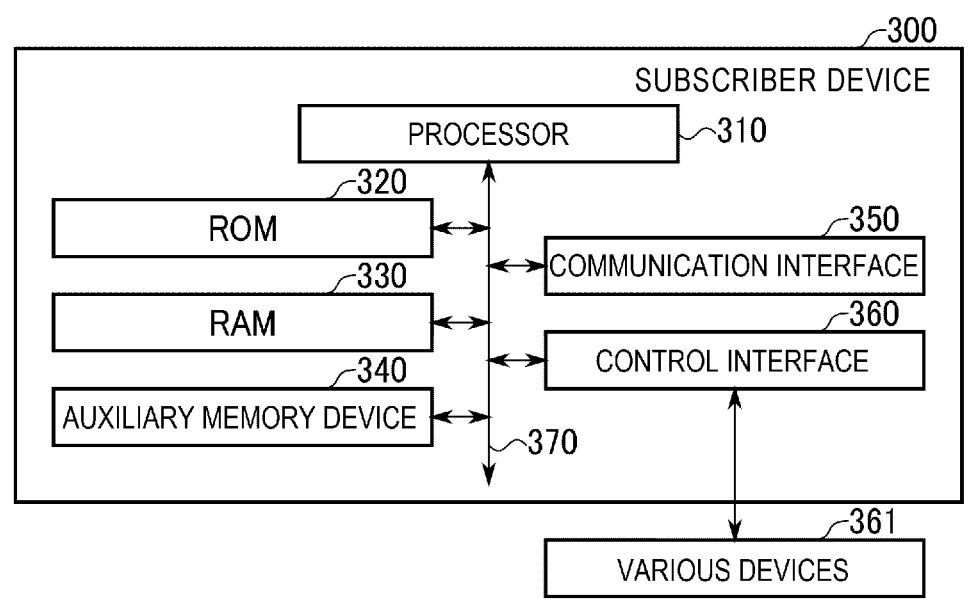
FIG. 5 is a block diagram showing a subscriber device according to a first embodiment.

FIG. 5 is a block diagram showing certain aspects of a subscriber device 300. The subscriber device 300 is a device that receives a message from one or more of the publisher devices 200. The subscriber device 300 is, for example, a PC, a server, or the like. Alternatively, the subscriber device 300 is a device that controls various devices 361, or the like. In an example, the subscriber device 300 includes a processor 310, a ROM 320, a RAM 330, an auxiliary memory device 340, a communication interface 350, and a control interface 360. Those components are connected to each other via a bus 370 or the like.

The processor 310 performs processing necessary for the subscriber device 300 to operate. The processor 310 controls each component to perform various functions of the subscriber device 300 by executing programs such as firmware, system software, and application software stored in the ROM 320, the auxiliary memory device 340, or the like. The processor 310 also executes processing, described later, based on these programs. A part or all of the functions achieved by the programs may be implemented by one or more circuits. The processor 310 is, for example, a CPU, an MPU, an SoC, a DSP, a GPU, an ASIC, a PLD, an FPGA, or the like. Alternatively, the processor 310 may be a combination of a plurality of these units.

The ROM 320 is a non-volatile memory that is not rewritable. The ROM 320 stores, for example, the foregoing programs and data or the like used by the processor 310 to perform various kinds of processing.

The RAM 330 is a main memory used to read and write data. The RAM 330 is used as a work area or the like for temporarily storing data that is used by the processor 310 to perform various kinds of processing. Typically, the RAM 330 is a volatile memory.

The auxiliary memory device 340 is, for example, an EEPROM, an HDD, a flash memory, or the like. The auxiliary memory device 340 stores, for example, system software, application software, and the foregoing programs. The auxiliary memory device 340 also stores data used by the processor 310 to perform various kinds of processing, and data and various set values or the like generated through the processing by the processor 310.

The communication interface 350 is a network interface circuit for the subscriber device 300 to communicate via the network NW2 or the like.

The control interface 360 is an interface circuit connectable to the various devices 361. The subscriber device 300 communicates with the various devices 361 via the control interface 360. The subscriber device 300 controls the various devices 361 via the control interface 360. The various devices 361 are, for example, peripheral devices including a printer, a camera, a display, a coin machine, or the like.

The bus 370 includes a control bus, an address bus, a data bus, and the like, and conveys a signal sent and received by each part of the subscriber device 300.

Figure 6:
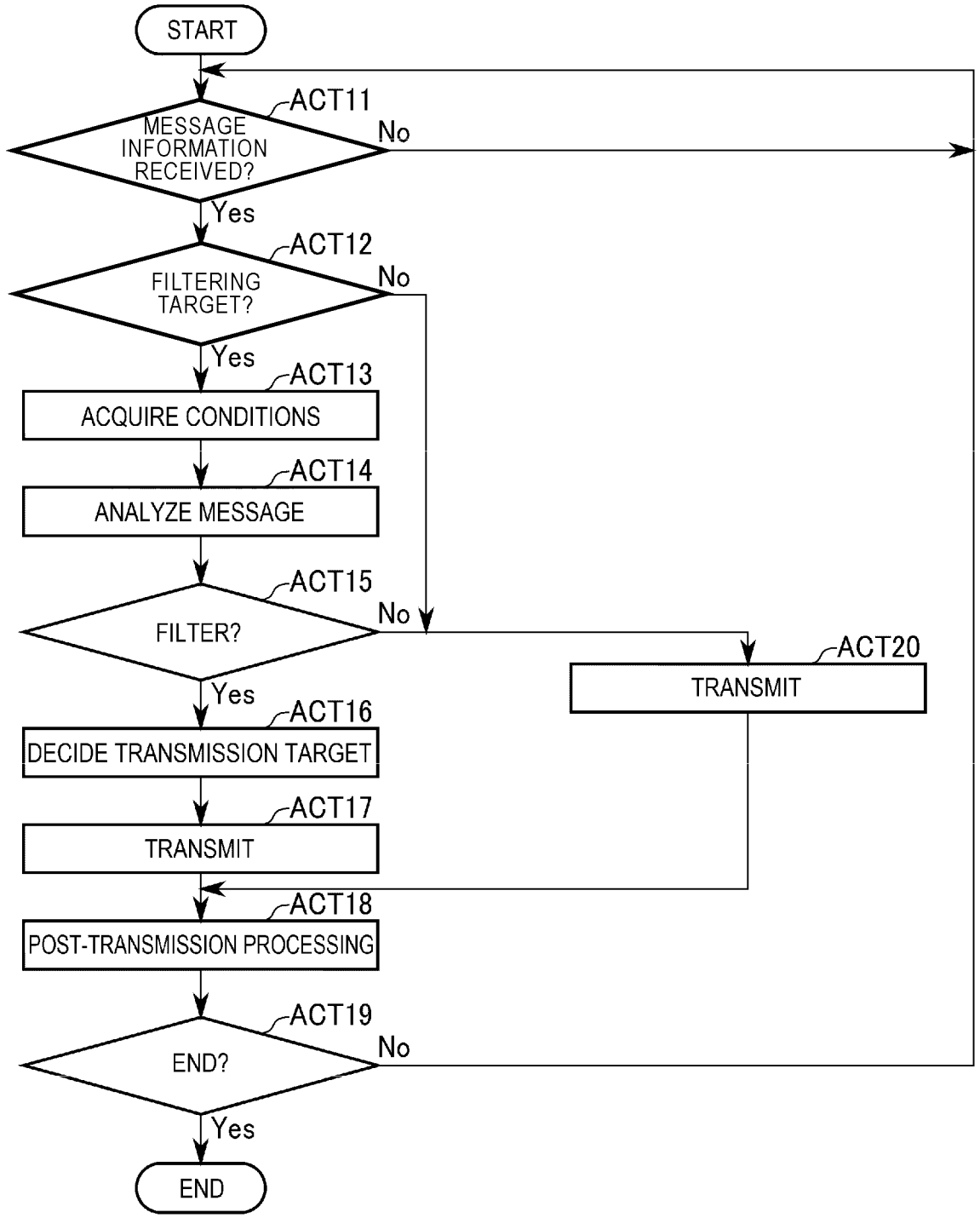
FIG. 6 is a flowchart of processing performed by a server device according to a first embodiment.

Operations of the subscription system 1 will now be described with reference to FIG. 6 and the like. The contents of processing in the description of the operations given below are simply an example. Various kinds of processing that can achieve similar results can be suitably used. FIG. 6 is a flowchart of processing performed by the server device 100. The processor 110 executes the processing shown in FIG. 6, for example, based on the program stored in the ROM 120 and/or the auxiliary memory device 140.

The processor 110 of the server device 100 starts the processing shown in FIG. 6, for example, when the message program 141 is executed.

Each publisher device 200 transmits message information to the server device 100. The message information includes, for example, a message and type information representing the type of the message. The message information is received by the communication interface 150 of the server device 100. The publisher device 200 transmitting the message information is the source of the message included in the message information.

If the publisher device 200 is a POS terminal, an example of the message transmitted from the publisher device 200 is receipt data. Another example of the message is a marketing message.

Meanwhile, in ACT 11 in FIG. 6, the processor 110 of the server device 100 waits for message information to be received by the communication interface 150. The processor 110 controls the communication interface 150 via the communication middleware 142 and thus performs reception processing. If message information is received (Yes in ACT 11), the processor 110 proceeds to ACT 12. The message included in the message information received at this point is hereinafter referred to as a "received message". The type of the message included in this message information is hereinafter referred to as a "received type".

Thus, the processor 110 performs reception processing on a received message based on the communication middleware 142 in cooperation with the communication interface 150.

In ACT 12, the processor 110 determines whether the received message is a filtering target. That is, the processor 110 refers to the subscription table T1 and determines whether the type of the received message is associated with "Yes" in the filtering target field. If the received message is a filtering target (Yes in ACT 12), the processor 110 proceeds to ACT 13.

In ACT 13, the processor 110 acquires all the filtering condition(s) correlated with the received type, with reference to the subscription table T1.

In ACT 14, the processor 110 analyzes the received message and thus determines whether the received message satisfies the filtering condition acquired in ACT 13. The filtering condition is, for example, whether the message includes a specific character string. Alternatively, the filtering condition is, for example, whether the message does not include a specific character string. The filtering condition may also be whether the message includes or not different character strings, such as a message may be checked as to whether includes a first specific character string and a second specific character string or a first specific character string but not a second specific character string. The filtering condition may be defined using various logical operators such as OR, AND, NOT, NOR, XOR NAND, or the like. For example condition may be represented generally in a manner such as "A AND B AND C" or "A OR (B AND C)", where A, B and C represent specific character strings or the like. The filtering condition may also be defined using a regular expression or the like. The character string can be, for example, in a text format, a binary format or any other format.

In an example, if the received type is receipt data, the filtering condition can be that the message includes a specific character string indicating that it is an electronic receipt.

In this way, the processor 110 performs the processing of ACT 14 and determines whether a character string included in a message satisfies a predetermined condition.

In ACT 15, the processor 110 determines whether to filter the received message. If it is determined by the message analysis in ACT 14 that the message satisfies the filtering condition, the processor 110 determines that the received message is to be filtered. If it is determined that the received message is to be filtered (Yes in ACT 15), the processor 110 proceeds to ACT 16.

In ACT 16, the processor 110 acquires destination information correlated with the filtering condition satisfied in ACT 14, with reference to the subscription table T1. The processor 110 then determines a destination of the received message based on the acquired destination information. The processor 110 identifies, for example, one or more of the subscriber devices 300 that match the destination information as the destinations of the message. An example of the destination information is a list of destination subscriber devices 300. In such a case, the processor 110 determines the subscriber devices 300 listed in the destination information as the destinations of the message.

In an example, if the received type is receipt data and the filtering condition is that the message includes a specific character string indicating that it is an electronic receipt, the destination subscriber devices 300 include: a device that distributes the electronic receipt, a device that saves the electronic receipt, a device that saves a journal, and the like.

In another example, if the received type is receipt data and the filtering condition is that the message does not include a specific character string indicating that it is an electronic receipt, the destination subscriber devices 300 include: a device that controls a printer printing a receipt, a device that saves a journal, and the like.

In ACT 17, the processor 110 instructs the communication interface 150 to transmit the received message to all the subscriber devices 300 decided as the destinations in ACT 16. The processor 110 controls the communication interface 150 via the communication middleware 142 and thus performs transmission processing. In response to this transmission instruction, the communication interface 150 transmits the received message to each subscriber device 300. The received message, thus transmitted, is received by the communication interface 350 of the subscriber device 300.

In this way, the processor 110 performs the processing of ACT 16 and ACT 17 so that a message is transmitted to a destination corresponding to a filtering condition.

Upon receiving a message transmitted from the server device 100, each subscriber device 300 performs control processing based on the message. For example, a subscriber device 300 controls a display to display an image based on the message. For example, a subscriber device 300 controls a printer to print an image of a receipt or the like based on the message. For example, a subscriber device 300 stores the message in the auxiliary memory device 340. For example, a subscriber device 300 virtually prints an image based on the message, using a virtual printer. For example, a subscriber device 300 distributes an electronic receipt based on the message. For example, a subscriber device 300 saves the message as a journal entry or the like.

Meanwhile, in ACT 18 in FIG. 6, the processor 110 of the server device 100 performs various kinds of processing according to need.

In ACT 19, the processor 110 determines whether an instruction to end the message program 141 is inputted. If an instruction to end the message program 141 is inputted (Yes in ACT 19), the processor 110 ends the processing shown in FIG. 6. On the other hand, if an instruction to end the message program 141 is not inputted (No in ACT 19), the processor 110 returns to ACT 11.

If the message is not a filtering target (No in ACT 12), the processor 110 proceeds to ACT 20. If it is not determined that the received message is to be filtered (No in ACT 15), the processor 110 proceeds to ACT 20.

In ACT 20, the processor 110 instructs the communication interface 150 to transmit the received message to the subscriber device 300 correlated with the received type in the subscription database. The processor 110 controls the communication interface 150 via the communication middleware 142 and thus performs transmission processing. In response to this transmission instruction, the communication interface 150 transmits the received message to each subscriber device 300. The received message, thus transmitted, is received by the communication interface 350 of the subscriber device 300. After the processing of ACT 20, the processor 110 proceeds to ACT 18.

On receiving the message transmitted from the server device 100, each subscriber device 300 performs processing based on this message, similarly to the above.

In the subscription system 1, the server device 100 receives a message transmitted from one of the publisher devices 200. If a character string included in the message satisfies a filtering condition, the server device 100 transmits the message to a destination correlated with the filtering condition. Thus, the server device 100 can transmit a message to some of the registered subscriber devices 300 by filtering, instead of transmitting the message to all the registered subscriber devices 300. In the related-art system, to limit transmission targets, for example, messages need to be subdivided by type, and whether to register a transmission target needs to be determined in relation to each type. In contrast, if the subscription system 1 is used, such subdivisions are not needed. Also, in the related-art system, to limit transmission targets, the software of the publisher devices 200 needs to be changed. In contrast, if the subscription system 1 is used, the software of the publisher devices 200 need not be changed and the publisher devices 200 may use common software.

Also, in the subscription system 1, subscriber devices 300 can each control various services (or devices associated with such services) such as for receipt printing, journal keeping, and electronic receipt delivery. Thus, a plurality of service functions can be easily shared between and/or handled independently by a plurality of subscriber devices 300.

In the subscription system 1, the server device 100 performs filtering according to whether a message includes a specific character string or not. Therefore, filtering can be performed without changing the message or adding additional information to the message.

In a subscription system 1 according to the first embodiment the message may be receipt data. However, there may be different types of receipt data. For example, the receipt data may be an electronic receipt or a paper receipt and a POS terminal may generate either or both types of receipt data. The server device 100 properly filters receipt data by type (or otherwise) and thus can transmit the receipt data to different subscriber devices 300 depending on whether the receipt data is electronic receipt data or paper receipt data. Thus, the server device 100 can cause a printer to print receipt data only when the receipt data is paper receipt data.

Second Embodiment

Figure 7:
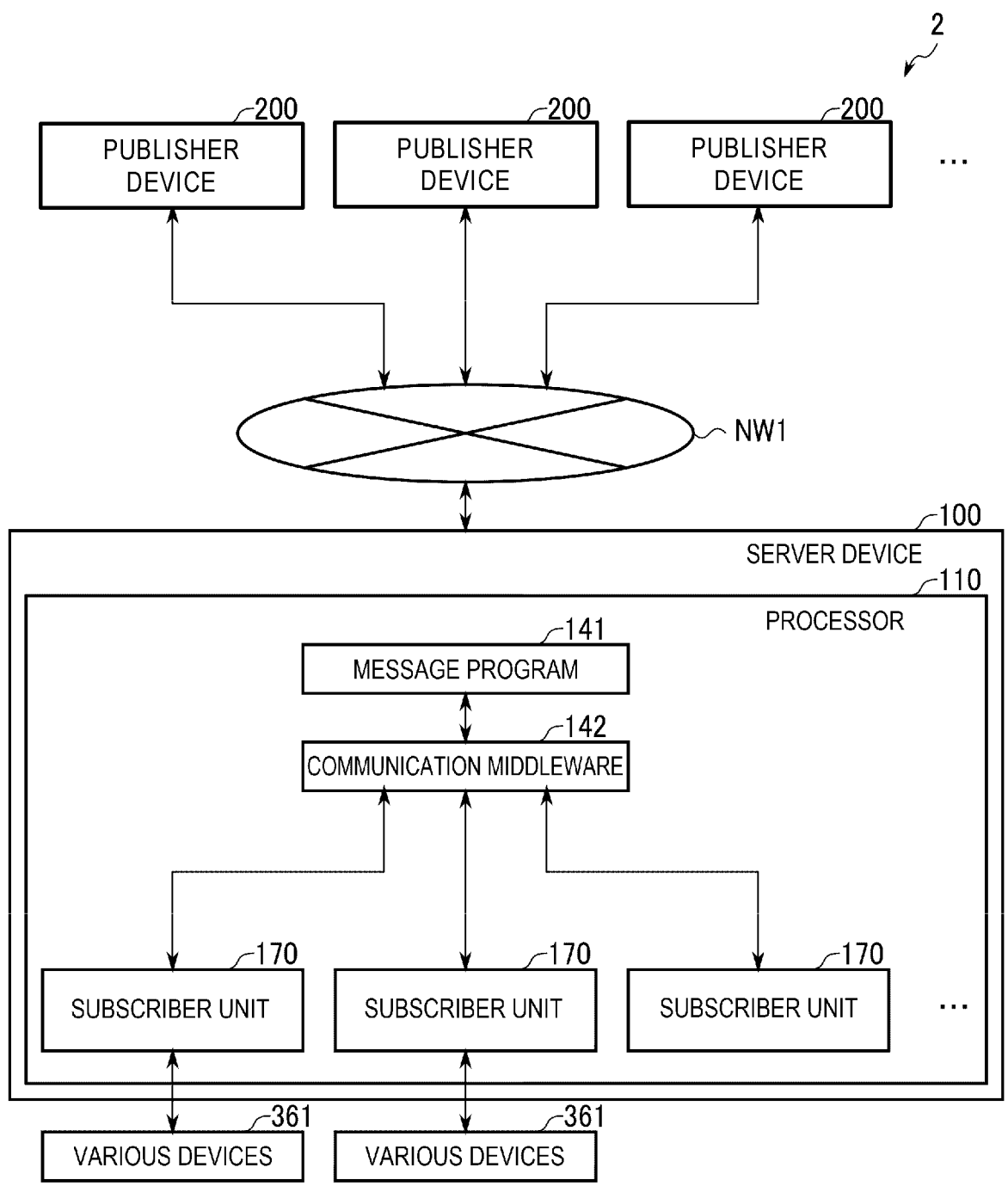
FIG. 7 is a block diagram showing a subscription system according to a second embodiment.

FIG. 7 shows a subscription system 2 according to a second embodiment. The subscription system 2 includes a server device 100 and a plurality of publisher devices 200. The numbers of server devices 100 and publisher devices 200 are not limited to the numbers shown in FIG. 7.

The hardware configuration of the server device 100 in the second embodiment is generally similar to that depicted in FIG. 2, however, the processor 110 of the server device 100 in the second embodiment executes message program 141 and communication middleware 142. The processor 110 also performs the functions of a plurality of subscriber units 170.

The subscriber units 170 function as virtual subscriber devices 300 or the like. As described in the first embodiment, each subscriber device 300 performs control processing based on a received message. Therefore, similarly, a subscriber unit 170 functions as a control unit that performs control processing based on a received message.

The server device 100 in the second embodiment performs the processing shown in FIG. 6. However, the server device 100 transmits a message to a subscriber unit 170 instead of a subscriber device 300. The subscriber units 170 operate similarly (though in a virtualized manner) to the subscriber devices 300 as described for the first embodiment.

The subscription system 2 achieves effect similar to those of the subscription system 1.

In the subscription system 2, the server device 100 may additionally function as the virtual subscriber devices 300

(subscription units 170). Therefore, in the subscription system 2, there is little to no network delay between the server device 100 and the subscriber units 170.

The foregoing example embodiments can be modified in various aspects.

For example, in the processor 110, the processor 210 or the processor 310, a part or all of the processing may be implemented by one or more dedicated circuits.

Each device in the example embodiments can be shipped or provided with, one or more programs for executing each of the foregoing processing stored therein. Alternatively, each device may be shipped or provided without such programs stored therein. In such a case, the programs may be provided separately and installed in each device after shipment or the like by an operator or a maintenance worker. The programs can be stored, for example, in a removable memory medium such as a disk medium or a semiconductor memory, or can be downloaded via the Internet, a LAN, or the like.

While some embodiments have been described, these embodiments are presented simply as examples and are not intended to limit the scope of the disclosure. These novel embodiments can be carried out in various other forms and can include various omissions, replacements, and modifications without departing from the spirit and scope of the disclosure. These embodiments and the modifications thereof are included in the scope of the disclosure and also included in the scope of the claims and equivalents thereof.

What is claimed is:

1. A server device, comprising:
   a communication interface configured to communicate with one or more publisher devices and one or more subscriber devices;
   a memory that stores data indicating a message type that may be issued by one or more of the publisher devices, the message type being stored in association with both a condition for filtering messages of the message type and destination information indicating one or more of the subscriber devices to which messages of the message type will be transmitted if the condition is satisfied; and
   a processor configured to:
      upon receipt of message information including a message and message type from a publisher device, refer to the data stored in the memory and determine whether the condition associated with the message type is satisfied by the message, and
      upon determining that the condition is satisfied, control the communication interface to transmit the message to the one or more of the subscriber devices indicated by the corresponding destination information, wherein
   the publisher devices include a point-of-sale (POS) terminal configured to issue first message information including receipt data as a message and a first message type indicating that the message is receipt data,
   the condition associated with the first message type is whether the message includes a character string indicating that the message contains electronic receipt data,
   the subscriber devices include a first device configured to control printing of paper receipts and a second device configured to distribute electronic receipts, the first and second devices being associated with the first message type in the data stored in the memory, and
   the processor is further configured to:
      determine whether the message type of the received message information is the first message type,
      when the message type of the received message information is the first message type, determine whether a character string included in the message of the received message information indicates that the message contains electronic receipt data,
      upon determining that the character string indicates that the message contains electronic receipt data, control the communication interface to transmit the message to the second device, and
      upon determining that the character string does not indicate that the message contains electronic receipt data, control the communication interface to transmit the message to the first device.

2. The server device according to claim 1, wherein the condition is whether the message includes a predetermined character string.

3. The server device according to claim 1, wherein the processor is further configured to perform a predetermined process if the condition is satisfied for a message.

4. The server device according to claim 1, wherein the message information does not include the destination information.

5. A communication method for a server device configured to handle communication between one or more publisher devices and one or more subscriber devices, the communication method comprising:
   storing data indicating a message type that may be issued by one or more of the publisher devices, the message type being stored in association with both a condition for filtering messages of the message type and destination information indicating one or more of the subscriber devices to which messages of the message type will be transmitted if the condition is satisfied;
   upon receipt of message information including a message and message type from a publisher device, referring to the stored data and determining whether a condition associated with the message type is satisfied by the message; and
   upon determining that the condition is satisfied for the message, transmitting the message to the one or more of the subscriber devices indicated by the corresponding destination information, wherein
   the publisher devices include a point-of-sale (POS) terminal configured to issue first message information including receipt data as a message and a first message type indicating that the message is receipt data,
   the condition associated with the first message type is whether the message includes a character string indicating that the message contains electronic receipt data,
   the subscriber devices include a first device configured to control printing of paper receipts and a second device configured to distribute electronic receipts, the first and second devices being associated with the first message type in the data stored in the memory, and
   the method further comprises:
      determining whether the message type of the received message information is the first message type,
      when the message type of the received message information is the first message type, determining whether a character string included in the message of the received message information indicates that the message contains electronic receipt data,
      upon determining that the character string indicates that the message contains electronic receipt data, transmitting the message to the second device, and upon determining that the character string does not indicate that the message contains electronic receipt data, transmitting the message to the first device.

6. The method according to claim 5, wherein the condition is whether the message includes a predetermined character string.

7. The method according to claim 5, further comprising: performing a predetermined process if the condition is satisfied.

8. The method according to claim 5, wherein the message information does not include the destination information.

9. A communication system for subscription-based content delivery, comprising:
one or more publisher devices each configured to issue message information including a message and message type;
one or more subscriber devices each configured to receive a message included in message information issued by the publisher devices; and
a server device including:
a communication interface configured to communicate with the publisher devices and the subscriber devices,
a memory that stores data indicating a message type that may be issued by one or more of the publisher devices, the message type being stored in association with both a condition for filtering messages of the message type and destination information indicating the subscriber devices to which messages of the message type will be transmitted if the condition is satisfied, and
a processor configured to:
upon receipt of message information including a message and message type from a publisher device, refer to the data stored in the memory and determine whether the condition associated with the message type is satisfied by the message, and
upon determining that the condition is satisfied for the message, control the communication interface to transmit the message to the one or more of the subscriber devices indicated by the corresponding destination information, wherein
the publisher devices include a point-of-sale (POS) terminal configured to issue first message information including receipt data as a message and a first message type indicating that the message is receipt data,
the condition associated with the first message type is whether the message includes a character string indicating that the message contains electronic receipt data,
the subscriber devices include a first device configured to control printing of paper receipts and a second device configured to distribute electronic receipts, the first and second devices being associated with the first message type in the data stored in the memory, and
the processor is further configured to:
determine whether the message type of the received message information is the first message type,
when the message type of the received message information is the first message type, determine whether a character string included in the message of the received message information indicates that the message contains electronic receipt data,
upon determining that the character string indicates that the message contains electronic receipt data, control the communication interface to transmit the message to the second device, and
upon determining that the character string does not indicate that the message contains electronic receipt data, control the communication interface to transmit the message to the first device.

10. The communication system according to claim 9, wherein the condition is whether the message includes a predetermined character string.

11. The communication system according to claim 9, wherein the processor is further configured to perform a predetermined process if the condition is satisfied.

12. The communication system according to claim 9, wherein each of the subscriber devices is configured to perform a predetermined process upon receipt of the message.

13. The communication system according to claim 12, wherein the predetermined process includes at least one of printing the message and displaying the message.

14. The communication system according to claim 9, wherein the message information does not include the destination information.

* * * * *